United States Patent [19]

Inkmann et al.

[11] Patent Number: 5,449,570

[45] Date of Patent: Sep. 12, 1995

[54] CONNECTION ARRANGEMENT FOR BATTERY MONITORING CIRCUITS

[75] Inventors: Mark S. Inkmann, Wauwatosa; Michael T. Reher, Grafton; Bradley N. Koeppel, Watertown; Brett M. Lenhardt, Milwaukee, all of Wis.

[73] Assignee: Globe-Union Inc., Milwaukee, Wis.

[21] Appl. No.: 316,616

[22] Filed: Sep. 30, 1994

[51] Int. Cl.$^6$ ............................................. H01M 10/48
[52] U.S. Cl. .................................... 429/92; 429/121; 429/179; 429/93
[58] Field of Search ...................... 429/90-93, 429/121, 123, 175, 178, 179, 7; 340/636; 364/483, 550, 551.01; 320/43, 48

[56] References Cited

U.S. PATENT DOCUMENTS

| | | | |
|---|---|---|---|
| 4,924,176 | 5/1990 | Tremblay | 324/133 |
| 4,957,828 | 9/1990 | Garron | 429/92 |
| 5,002,840 | 3/1991 | Klebenow et al. | 429/9 |
| 5,057,383 | 10/1991 | Sokira | 429/92 |
| 5,130,699 | 7/1992 | Reher et al. | 340/661 |
| 5,159,272 | 10/1992 | Purushothama et al. | 324/429 |
| 5,281,493 | 1/1994 | Jones | 429/179 |
| 5,321,627 | 6/1994 | Reher | 364/483 |

Primary Examiner—Anthony Skapars
Attorney, Agent, or Firm—Leonard J. Kalinowski; E. L. Levine; Joseph E. Root, III

[57] ABSTRACT

An arrangement for mounting a battery monitoring circuit on the cover of the battery and for connecting the terminal ends of first and second lead wires of a battery monitoring circuit to the positive and negative terminals of the battery, the arrangement including a cavity formed in the battery cover for mounting the battery monitoring circuit, first and second battery terminal bushings which are molded integrally with the cover and are adapted to be mounted on and connected to the positive and negative battery terminals when the battery cover is installed on the battery, each of the battery terminal bushings including a pad having an upwardly directed mounting post that is adapted to receive and secure the terminal end of one of the lead wires of the battery monitoring circuit, the battery cover having first and second lead wire slots in its surface which extend from the cavity in which the battery monitoring circuit is mounted, to the locations of the battery terminal bushings for directing the lead wires to the mounting posts and for protecting the leads from damage during use.

23 Claims, 3 Drawing Sheets

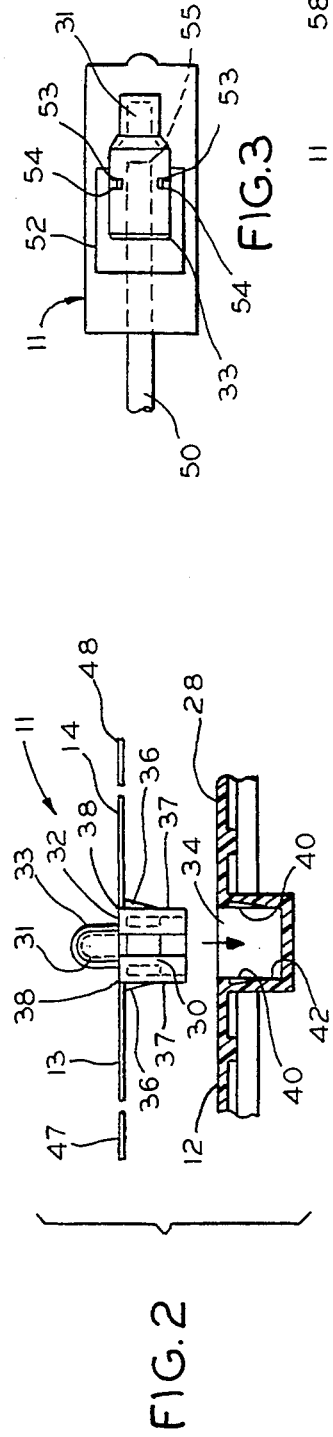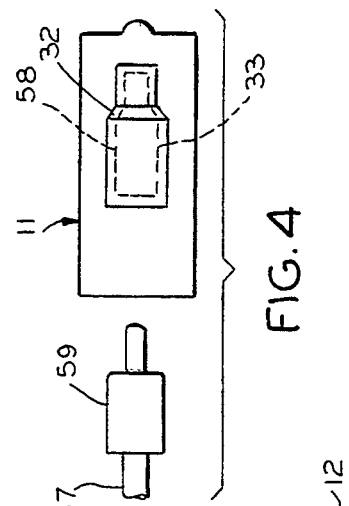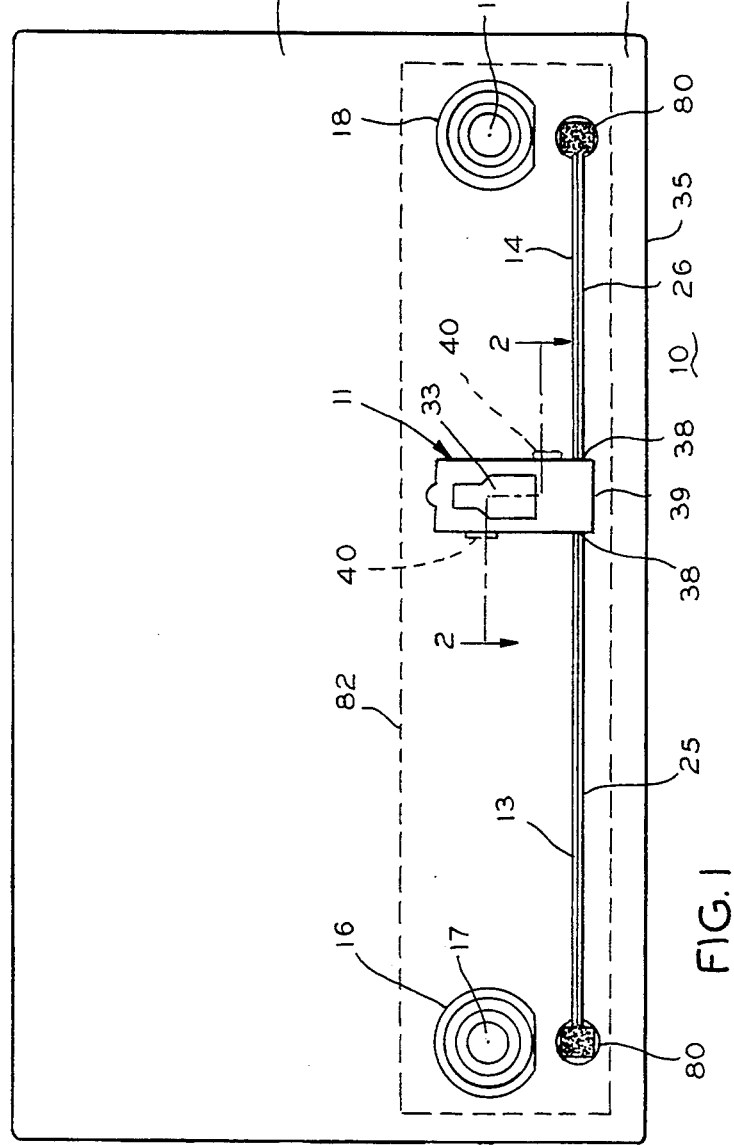

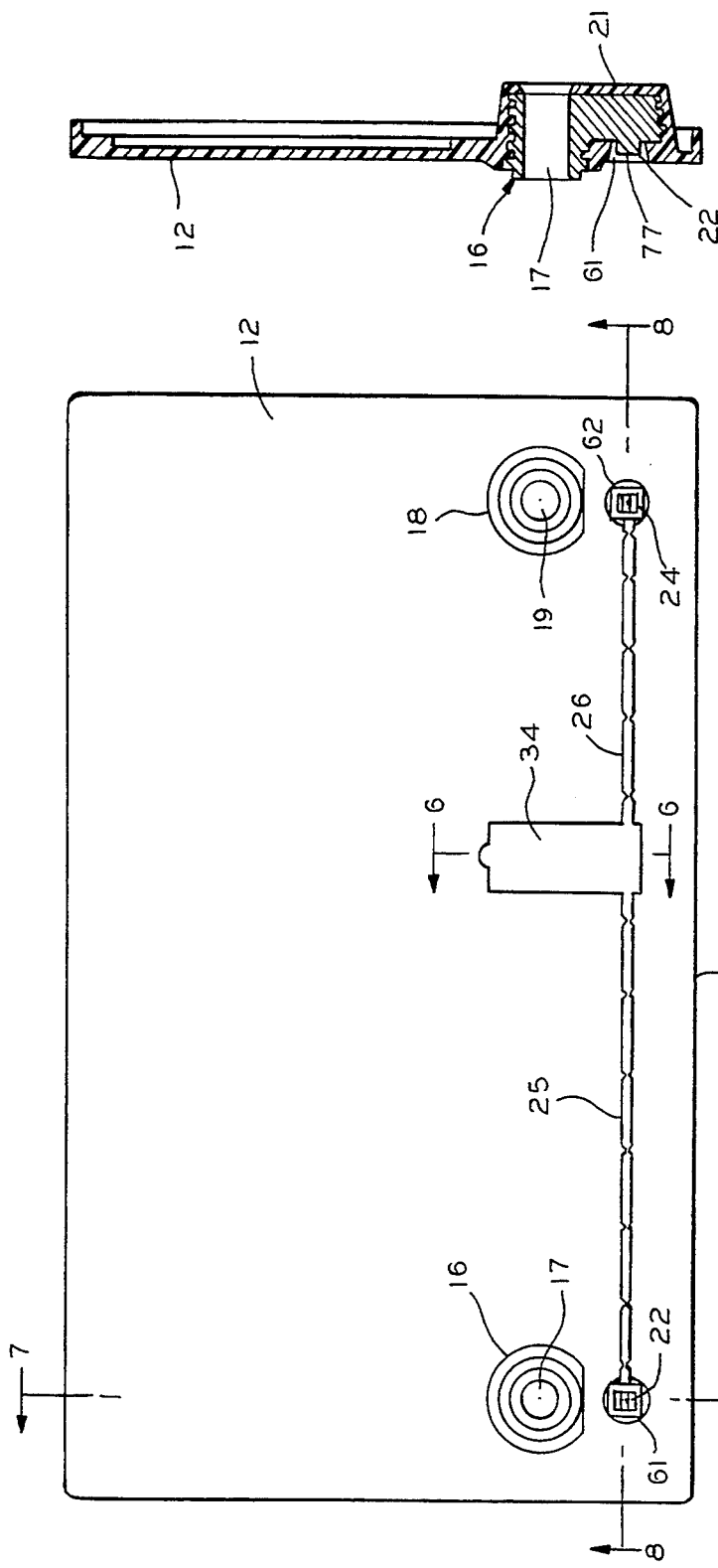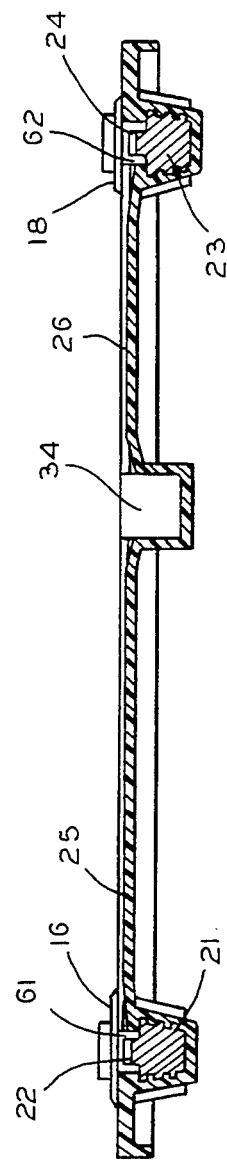

CONNECTION ARRANGEMENT FOR BATTERY MONITORING CIRCUITS

BACKGROUND OF THE INVENTION

This invention relates to storage battery assemblies, and more particularly, to a connection arrangement for battery monitoring circuits that monitor conditions and/or operating parameters of storage batteries that are used in deep cycle applications, or for motor vehicle batteries, and the like.

Storage batteries are often used in deep cycle applications to provide electrical energy to power electrical devices such as electric motors or emergency lighting. Typical deep cycle applications for a battery include providing power to lights and accessories in recreational vehicles, providing power to an electric trolling motor in a fishing boat, providing power to the electric drive of a battery-operated wheelchair, or providing back-up and emergency power for security systems. There is also a great deal of interest in the adaptability of storage batteries to "electric cars". In such applications, the storage battery may be required to supply current for several hours. Supplying this current will discharge the battery to a relatively low state of charge. In view of this, batteries are being produced which include a state of charge monitoring circuit for providing a visual or audible indication when the state of charge of the battery has fallen below a predetermined threshold. Examples of battery state of charge monitoring circuits are disclosed in the U.S. Pat. No. 5,130,699 to Michael Reher et al. which was issued on Jul. 14, 1992 and which is assigned to Globe Union Inc., and in the co-pending U.S. patent application Ser. No. 08/030,648 of Michael T. Reher et al., which was filed on Mar. 12, 1993 and which is assigned to Globe Union Inc.

Although such monitoring circuits are particularly suited for deep cycle applications, the monitoring circuits can be used in other applications, such as for monitoring one or more operating parameters of storage batteries used in motor vehicles and providing an output indicative of the monitored condition for use by the vehicle computer for control and diagnostic purposes. For example, the U.S. Pat. No. 5,321,627 to Michael T. Reher which was issued on Jul. 14, 1992 and which is assigned to Globe Union Inc., discloses a battery monitor which provides an indication of the absolute state of charge, the relative state of charge, and the capacity of a battery under discharge, rest, and recharge conditions, as well as other information and indications.

Most battery state of charge monitoring circuits include an electronic circuit that must be continually connected to the terminals of the battery being monitored. To facilitate such connections, the monitoring circuit is usually installed permanently into or onto the battery and connected to the positive and negative terminals of the battery. Typically, the connections to the battery terminals are accomplished through permanent copper bus bars that are molded into the battery cover using an injection molding process. This requires that the battery cover be of a non-standard size to accommodate the bus bars. In addition, the bus bars must be sized so that they can withstand the injection molding process resulting in substantially more metal than is necessary to meet the conductor resistance requirement. Studies have demonstrated that the cost of molding bus bars into the battery cover for this purpose is prohibitive. Moreover, because of their size and because the thermal expansion characteristics of the bus bars may differ from those of the cover, the bus bars must be free to move relative to the termination by which they are connected to the battery terminals.

In U.S. Pat. No. 5,159,272 to Purushothama Rao et al. which was issued on Oct. 27, 1992, there is disclosed an arrangement for installing a battery monitoring device on a battery which includes secondary terminal arms which project from the battery terminal bushings and terminate in upwardly extending conical sections defining secondary battery terminals which protrude through openings in the bottom surface of the housing of the battery monitoring device and engage terminal contacts of the battery monitoring device interiorly of the housing of the battery monitoring device. Acid proof seals are incorporated into the housing of the battery monitoring device to provide a seal at the terminal receiving openings in the bottom surface of the housing. Because the secondary battery terminals defined by the battery terminal bushings are connected directly to the circuit of the battery monitoring device, this arrangement requires relatively long secondary terminal arms, even though the housing of the battery monitoring device extends over more than half the length of the battery cover. Also, because of the size of the battery monitoring device, a non-standard cover is required to accommodate the device.

SUMMARY OF THE INVENTION

The present invention provides an arrangement for mounting a battery monitoring circuit on a battery cover and for electrically and mechanically connecting lead wires of the battery monitoring circuit to the positive and negative terminals of the battery. In accordance with the invention, the battery cover includes means for securing the battery monitoring circuit to the cover and first and second lead wire slots which extend from the location of the battery monitoring circuit to the locations of the battery terminals. The lead wires of the battery monitoring circuit are pressed into the lead wire slots which direct the lead wires to mounting sites which are defined by extensions of the battery terminal bushings. The terminal ends of the lead wires are electrically and mechanically connected to the mounting sites in a suitable manner. For example, in accordance with one embodiment, each mounting site is defined by an upwardly projecting post which has a notch formed in its upper end for receiving the terminal end of one of the lead wires. The extensions of the battery terminal bushings locate the mounting posts in wells that are molded into the battery cover. The lead wire slots terminate at the wells so that when the lead wires are pressed into the lead wire slots, the terminal ends of the lead wires are guided directly into the notches in the mounting posts. The mounting posts of the battery terminal bushings are made of a material, such as lead or a lead alloy, that will melt around the terminal ends of the lead wires when heated by a soldering iron, for example.

In accordance with a preferred embodiment, the battery cover has molded therein a cavity which is adapted to receive and secure the battery monitoring circuit module. The cavity in the battery cover locates the housing of the battery monitoring circuit such that the lead wire output apertures of the housing align with the slots formed in the battery cover to facilitate the positioning of the lead wires in the lead wire slots.

The battery monitoring circuit includes a light emitting diode that provides a visual output for indicating a condition of the battery being monitored by the battery monitoring circuit. In accordance with a further feature of the invention, a light guide, such as a fiber-optic cable, is used as a light transmission medium to permit light emitted by the light emitting diode to be conducted to a location remote from the location of the battery being monitored, for display at or near the dash board of a motor vehicle or the control console of a boat or other type of vehicle, for example.

In another embodiment, the monitoring circuit includes a socket for receiving the plug of an electrical cable for conducting an electrical signal, indicative of the status of the monitored condition, to a location remote from the location of the battery for controlling a suitable indicator device at the remote location.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 1 is a plan view of a cover assembly for a battery including a battery monitoring circuit module mounted on a battery cover with the lead wires of the battery monitoring circuit connected to the battery terminals by the connection arrangement provided by the present invention;

FIG. 2 is a fragmentary vertical section view taken along the line 2—2 of FIG. 1 and with the battery monitoring circuit module shown above the cavity in the battery cover, prior to being inserted into the cavity;

FIG. 3 is a view of the monitoring circuit housing and illustrating one embodiment of a remote monitoring arrangement including a light guide;

FIG. 4 is a view of the monitoring circuit housing and illustrating another embodiment of a remote monitoring arrangement including an electrical plug and socket;

FIG. 5 is a plan view of the battery cover of FIG. 1 prior to mounting the battery monitoring circuit module thereon;

FIG. 6 is a fragmentary side view in section taken along the line 6—6 of FIG. 5;

FIG. 7 is a side section view taken along the line 7—7 of FIG. 5;

FIG. 8 is a vertical section view taken along the line 8—8 of FIG. 5;

DESCRIPTION OF THE PREFERRED EMBODIMENTS

Figure 11:
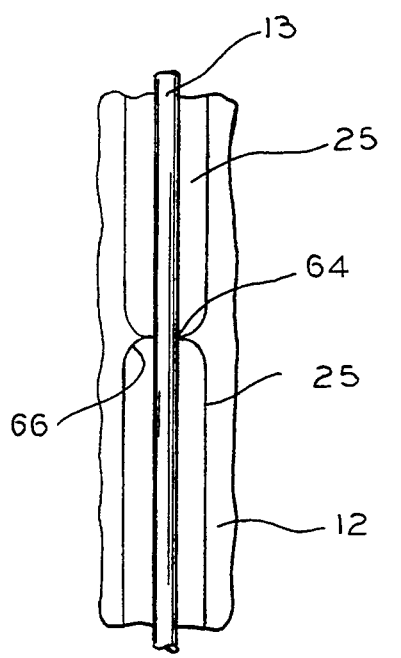
FIG. 11 is an enlarged fragmentary view illustrating a portion of one of the lead wire slots formed in the battery cover.

Referring to FIGS. 1 and 2 of the drawings, there is illustrated a cover assembly 10 for a battery, incorporating the connection arrangement according to the present invention for mounting a monitoring circuit module 11 on a battery cover 12 and for connecting lead wires 13 and 14 of the monitoring circuit module 11 to the positive and negative terminals of the battery.

The cover assembly 10 includes a battery terminal bushing 16 and a battery terminal bushing 18 which are molded into the cover 12. The battery terminal bushing 16 has an opening 17 therethrough which receives the positive battery terminal in an electrical conducting relationship, the battery terminal bushing 16 being connected to the positive battery terminal such as by welding when the cover assembly 10 is assembled on the battery housing. Similarly, the battery terminal bushing 18 has an opening 19 therethrough which receives the negative battery terminal in an electrical conducting relationship, the battery terminal bushing 18 being connected to the negative battery terminal such as by welding when the cover assembly 10 is assembled on the battery housing. The battery terminal bushings 16 and 18 include respective extensions 21 and 23, shown in FIGS. 7-10, which define respective mounting sites defined by mounting posts 22 and 24 to facilitate connection of the lead wires of the battery monitoring circuit to the battery terminals.

The lead wires 13 and 14 of the monitoring circuit module 11 are positioned in lead wire slots 25 and 26 formed in the upper surface 28 of the battery cover 12. The lead wire slots 25 and 26 extend from the location of the monitoring circuit module 11 to the battery terminal bushing 16 and a battery terminal 18, respectively. One of the lead wires 13 has its terminal end 47 electrically and mechanically connected to the mounting post 22 of the battery terminal bushing 16 that is connected to the positive battery terminal when the cover is assembled on the battery. Similarly, the other lead wire 14 has its terminal end 48 electrically and mechanically connected to the mounting post 24 of the battery terminal bushing 18 that is connected to the negative battery terminal when the cover is assembled on the battery. The mounting posts are offset from the battery terminals and recessed below the upper surface 28 of the battery cover 12.

By way of illustration of the invention, the monitoring circuit module 11 is assumed to include a state of charge indicator circuit such as the charge indicator that is disclosed in the co-pending U.S. patent application Ser. No. 08/030,648 of Michael T. Reher et al., which was filed on Mar. 12, 1993, which application is incorporated herein by reference. However, the connection arrangement can be used to mount other types of monitoring circuits, switching devices, or control devices on a battery cover, in or on the battery housing, and to connect such circuits or devices in circuit with the battery.

Briefly, the state of charge indicator monitors a voltage produced by a depletable energy source, such as a storage battery, and provides an indication when the state of charge falls below a predetermined threshold. The state of charge indicator includes an input circuit for sensing the battery voltage and producing a plurality of sense voltages that are proportional to the voltage between the battery terminals. The state of charge indicator includes a monitor circuit for comparing these voltages with a corresponding threshold voltage and producing an output signal for each sense voltage falling below its corresponding threshold. The output signals for a plurality of comparisons are stored in memory and used for producing an accumulated status. An output circuit including a light emitting diode produces a visual indication of low state of charge when the accumulated status exceeds a threshold value. The monitoring circuit, indicated generally at 30 in FIG. 2, is contained within a housing 32. The light-emitting diode 31, which provides a visual indication of a condition of the battery being monitored by the battery monitoring circuit, is located within a raised portion 33 of the housing.

The battery monitoring circuit module 11 is mounted in a cavity 34 formed in the upper or outer surface 28 of the battery cover 12 near the front edge 35 of the battery cover 12. The module housing 32 is sized to fit within the cavity 34. The housing 32 has projections 36 on opposite sides of the sidewalls 37 of the housing which are received in recesses 40 in the side walls 42 of the cavity 34 when the module is mounted in the cavity, for securing the module 11 to the battery cover 12 by the housing 32. The housing 32 has openings 38 near one end 39 thereof through which the lead wires 13 and 14 are fed to the lead wire slots 25 and 26, so that the housing 32 locates the lead wires in the lead wire slots. The light-emitting diode 31 contained within the raised portion 33 of the housing is exposed to view at the upper surface of the battery. The housing 32 is made of a translucent plastic material so that light emitted by the light-emitting diode 31 can be seen through the housing.

Digressing, with reference to FIG. 3, in accordance with a feature of the invention, the light emitting diode 31 is coupled to a location remote from the battery by way of a light guide 50, or the like. The light guide 50 is mounted to the module housing 32 by a yoke 52 which has projections 53 at the ends of its arms which are received in recesses 54 in the outer surface of the module housing. One end 55 of the light guide is passed through an opening in the end wall of the raised portion 33 of the module housing. The yoke 52 locates the end 55 of the light guide in close proximity to the light emitting diode 31 to permit light emitted by the light emitting diode to be conducted through the light guide to a location remote from the location of the battery being monitored, for display at or near the dashboard of a motor vehicle or the control console of a boat or other type of vehicle, for example.

Referring to FIG. 4, in accordance with a further embodiment, an electrical signal output that is indicative of the status of the monitored condition for the battery being monitored by the battery monitoring circuit 30 is extended by an electrical cable 57 to a location remote from the location of the battery for controlling a suitable indicating device or circuit. The battery monitoring circuit includes an electrical socket 58 adapted to receive the plug 59 of the electrical cable 57. The electrical socket is mounted within the raised portion 33 of the module housing 32.

Referring to FIGS. 5-8, which illustrate the battery cover 12 prior to its assembly with the battery housing, the battery cover 12 is formed by injection molding to mold in the lead wire slots 25 and 26, the module cavity 34 and other features of the battery not shown, such as vent cap openings, internal strengthening ribs, etc. Preferably, the battery terminal bushings 16 and 18 are molded into the cover 12 during the injection molding process in the manner known in the art. The module cavity 34 extends inwardly from the upper surface 28 of the battery cover and is located inward from the front edge 35 of the battery cover 12. The module cavity is offset relative to the center of the battery cover so that the raised portion 33 of the monitoring circuit module, which projects above the surface 28 of the battery cover, does not interfere with hold-downs or battery clamping devices that maintain the battery in position on the marine craft, motor vehicle or other vehicle with which it is used. The upper portion 33 of the module housing 32 containing the light emitting diode does not project higher than the vent caps (not shown) that are located on the upper surface of the battery in the conventional manner. Moreover, the light-emitting diode 31 shown in FIG. 3, or the socket 58 shown in FIG. 4, can be located within the cavity so that the module housing 32 is flush with the upper surface of the battery cover.

The mounting portions 22 and 24 of the battery terminal bushings are located in wells 61 and 62 which are molded into the cover 12, which provide access to the mounting posts but permit the mounting posts to be located recessed relative to the upper surface 28 of the battery cover 12. The lead wire slots 25 and 26 are molded into the cover 12, extending generally parallel to and spaced inward from the front edge 35 of the cover 12. The lead wire slot 25 extends from one side of the cavity 34 to the well 61 and the lead wire slot 26 extends from the other side of the cavity 34 to the well 62. In the preferred embodiment, in which the monitoring circuit module is mounted on the upper surface of the battery cover and the connection of the monitoring circuit to the battery terminals is made on the top of the battery cover 12, the module cavity, the lead wire slots, and the extensions 21 and 23 of the terminal bushings are isolated from the interior of the battery by the lower surface of the battery cover. However, the monitoring module can be mounted on the inner surface of the cover, or within the battery housing, and encapsulated to protect the circuit and the connections thereto from the electrolyte contained within the battery.

The lead wires 13 and 14 of the battery monitoring circuit 30 are insulation coated, small gauge wires formed of copper or another highly conductive material. For example, the lead wires may be 28 gauge wire. The lead wires are pressed into the lead wire slots 25 and 26 in the cover 12 using a roller type tool or any other suitable tool.

The lead wire slots are substantially rectangular in cross section and are formed to be wider than the outer diameter of the lead wires. Each lead wire slot, such as lead wire slot 25 shown in FIG. 11, has a plurality of pairs of inwardly directed portions 64 and 66 which define pinch points spaced periodically along the length of the lead wire slot. The inwardly directed portions 64 and 66 are spaced apart a distance that is less than the outer diameter of the lead wire so that the portions 64 and 66 engage the lead wire, pinching the lead wire to hold the lead wire in the slot 25. The pinch points provide compensation for variations in the tolerance in the outer diameter of the lead wires.

Figure 9:
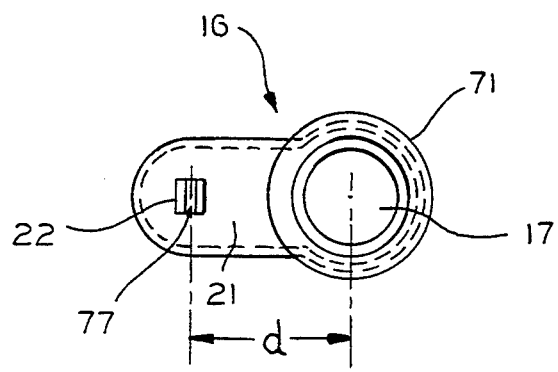
FIG. 9 is a plan view of a battery terminal bushing provided by the present invention.
Figure 10:
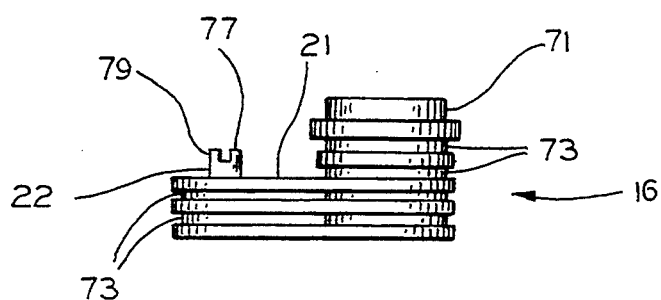
FIG. 10 is an side elevation view of the battery terminal bushing shown in FIG. 9.

The battery terminal bushings 16 and 18, which connect the terminal ends 47 and 48 (FIG. 2) of the lead wires 13 and 14 to the positive and negative terminals of the battery, are identical in size and shape, and accordingly, only battery terminal bushing 16 is described in detail. Referring to FIGS. 9 and 10, battery terminal bushing 16 includes a cylindrical body portion 71 having an annular flange 72 near its upper end and the extension 21 near its lower end. The cylindrical portion has a central aperture 17 extending therethrough from its upper end to its lower end for receiving the positive battery terminal of the battery on which the cover assembly is mounted. The extension 21 projects radially outward from the body portion 71 at the lower end thereof and has a curved outer end. The vertical height of the extension 21 is about half the height of the cylindrical battery terminal receiving portion and of a width that corresponds to the diameter of the central aperture 17. The extension 21 includes an upstanding portion near its curved outer end which defines the mounting post 22. The mounting post has a notch 77, which may be a "v"-shaped notch, in its upper end 79 for receiving the terminal end of the lead wire. The length of the extension 21 is selected to locate the mounting post to be offset laterally a distance "d" from the axis of the aperture 17. The peripheral edge of the battery terminal bushing, including the cylindrical portion 71 and the extension 21, has grooves 73 formed therein for minimizing leakage of the electrolyte upwardly through the battery terminal bushing in the completed battery. The battery terminal bushings 16 and 18, including the extension portions 21 and 23 and the mounting posts, are made of lead or a lead alloy.

Preferably, the terminal ends 47 and 48 of the lead wires are connected to the mounting posts by a soldering operation. The terminal ends are tinned to improve the connection between the wire ends and the mounting posts. The terminal ends 47 and 48 can be secured to the mounting posts in other ways. For example, the terminal ends 47 and 48 can be connected using an insulation displacement connector molded into the lead terminal bushing. Moreover, the connection can be accomplished using a female/male disconnect technique with the male disconnect terminal being molded into the lead terminal bushing and the female terminal being attached to the end of the lead wire. Another connection arrangement that could be used is to terminate the lead wire with a modified banana jack connector and forcing the connector into a small hole formed in the lead terminal bushing. Also, the lead wire could be stapled to the lead terminal bushing and covering the connection with potting compound to enhance the connection. Moreover, the lead wires can be connected to the lead terminal bushing using a crimped connection or riveted to the lead terminal bushing using pop rivet connection arrangement. Another way of connecting the monitoring circuit to the lead terminal bushing is to use strips of conductive plastic in place of the metal lead wires and securing the conductive plastic strips to the lead terminal bushing by conductive adhesive.

Figure 12:
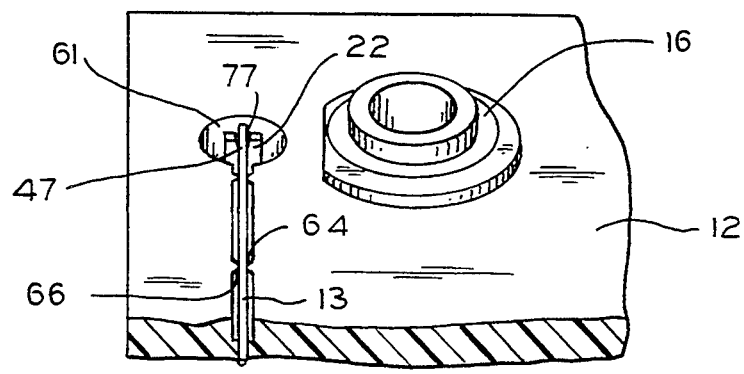
FIG. 12 is an enlarged fragmentary view of a portion of the cover illustrating the connection of the terminal end of a lead wire to the mounting post of a battery terminal bushing.

As is shown in FIG. 12, the notch 77 of the mounting post 22 is aligned with the lead wire slot 25 so that the terminal end 47 of the lead wire 13 falls into the notch 77 as the lead wire is being pressed into the lead wire slot. When the terminal ends of the two lead wires are positioned in the notches in the respective mounting posts 22 and 24 (FIG. 5), the lead wires are secured to the mounting posts by heating the mounting posts with a soldering iron. This causes the lead material of the mounting posts to flow around the lead wires, forming an low resistance electrical connections between the terminal ends 47 and 48 of the lead wires and the mounting posts 22 and 24 and mechanically connecting the lead wires to the mounting posts. Consequently, when the battery cover assembly 10 is assembled with the battery housing and the battery terminal bushings are welded to the battery terminals, the lead wires of the monitoring circuit are connected to the battery terminals. The battery terminal bushings 16 and 18 are welded to the battery terminal in the manner known in the art for assembling a cover on a battery housing.

Referring to FIG. 1, the connection areas at which the connection are made between the terminal ends 47 and 48 of the two lead wires and the mounting posts are encapsulated with a suitable potting compound, as indicated by the reference numeral 80, to protect the connection from physical and chemical damage. The lead wire slot is sized such that the upper surface of each of the insulated lead wires is flush with the top surface of the battery cover. Moreover, the mounting post is recessed below the upper surface of the battery cover 12 to allow sufficient volume within the well to encapsulate the electrical connection with potting compound, obtaining a flush surface between the top of the battery cover and the potting compound. The connection sites and the area around the battery terminals and around the monitoring circuit module may be covered by a label or decal, which is represented by the dashed line 82 in FIG. 1, to provide further protection for the lead wires. The label or decal may bear information about use and operation of the battery monitoring circuit and/or about the battery itself.

Thus, it has been shown that this invention provides an arrangement for mounting a battery monitoring circuit on a battery cover and for electrically and mechanically connecting lead wires of the battery monitoring circuit to the positive and negative terminals of the battery. In accordance with the invention, the battery cover has a cavity molded therein for mounting the battery monitoring circuit and first and second lead wire slots are molded into the cover for directing the lead wires to the locations of the battery terminals. The lead wires of the battery monitoring circuit are pressed into the lead wire slots and extend therein to lead mounting posts which are defined by the battery terminal bushings. The cavity in the battery cover locates the housing of the battery monitoring circuit with lead wire output apertures of the housing aligned with the slots formed in the battery cover to facilitate the positioning of the lead wires in the slots. The terminal ends of the wire leads are electrically and mechanically connected to the mounting posts in a suitable manner. In the exemplary embodiment, the mounting posts have a notch formed in their upper end which receives and holds the terminal end of the lead wire. The connector post is formed of lead, or a lead alloy, and is heated to flow around the terminal end of the lead wire to make to connection.

Although in the exemplary embodiment, the battery monitoring circuit is shown mounted on the outer surface of the cover, the battery monitoring circuit could be mounted on the inner surface of the battery cover and be enclosed within the battery when the cover assembly is assembled on the battery. In such arrangement, the monitoring circuit and the lead wires also would be encapsulated with epoxy or other acid resistant material. While the invention has been described with reference to preferred embodiments, various modifications can be made without departing from the spirit and scope of the invention as defined in the appended claims.

We claim:

1. An arrangement for mounting a battery monitoring circuit on a battery cover and for connecting terminal ends of first and second lead wires of the battery monitoring circuit to the positive and negative terminals of the battery, said arrangement comprising:

first and second battery terminal bushings carried by said battery cover, said first battery terminal bushing including a body portion adapted for connection to said positive battery terminal and a first extension projecting from said body portion of said first battery terminal bushing and having a mounting site spaced apart laterally from said body portion of said first battery terminal bushing and from said battery monitoring circuit, said mounting site of said first extension being adapted to receive said terminal end of said first lead wire, said second battery terminal bushing including a body portion adapted for connection to said negative battery terminal and a second extension projecting from said body portion of said second battery terminal bushing and having a mounting site spaced apart laterally from said body portion of said second battery terminal bushing and from said battery monitoring circuit, said mounting site of said second extension being adapted to receive said terminal end of said second lead wire;

said battery cover including securing means cooperating with said battery monitoring circuit for securing said battery monitoring circuit to said battery cover;

a first lead wire slot provided in said battery cover and extending from the location of said battery monitoring circuit to a location adjacent to said first mounting site;

said first lead wire of said battery monitoring circuit being positioned in said first wire slot and extending from said battery monitoring circuit to said first mounting site with its terminal end located adjacent to said first mounting site;

a second lead wire slot provided in said battery cover and extending from the location of said battery monitoring circuit to a location adjacent to said second mounting site, said second lead wire of said battery monitoring circuit being positioned in said second lead wire slot and extending from said battery monitoring circuit to said second mounting site with its terminal end located adjacent to said second mounting site;

and means for connecting said terminal ends of said first and second lead wires electrically and mechanically to said mounting sites of said first and second extensions of said first and second battery terminal bushings, respectively.

2. The arrangement according to claim 1, wherein each of said lead wire slots includes lead wire retaining means for retaining said lead wires in said lead wire slots.

3. The arrangement according to claim 2, wherein said lead wire retaining means includes inwardly directed portions of the side wall of the lead wire slot, said inwardly directed portions being disposed in pairs along the length of the lead wire slot, defining pinch points for the lead wires, said pinch points being disposed spaced apart along the length of said lead wire slot.

4. The arrangement according to claim 1, wherein said battery cover includes a cavity in an upper surface thereof for receiving said battery monitoring circuit, and wherein said cover includes first and second openings in said upper surface, said first and second lead wire slots being formed in said upper surface of said battery cover and terminating at said first and second openings, respectively, and wherein said first and second mounting sites include first and second mounting posts located in said first and second openings, respectively, in alignment with said first and second lead wire slots.

5. The arrangement according to claim 4, wherein said connecting means includes a solder connection between said mounting posts and said terminal ends of said lead wires at said mounting sites.

6. The arrangement according to claim 5, including means for encapsulating said mounting sites at which the connections are made between the terminal ends of said lead wires and said mounting posts.

7. The arrangement according to claim 4, wherein the depth of each of said lead wire slots is such that the lead wire positioned therein is recessed relative to said upper surface of said battery cover.

8. The arrangement according to claim 4, wherein said battery monitoring circuit is enclosed within a housing having first and second sidewall portions, and wherein said securing means comprises projections formed on said first and second sidewall portions of said housing that cooperate with recessed portions of the sidewall of said cavity that are adjacent to said sidewall portions of said housing.

9. The arrangement according to claim 4, wherein said body portions of said first and second battery terminal bushings are generally cylindrical in shape and have a central aperture for receiving the associated battery terminals, and wherein each of said extensions includes a generally flat, flange-like portion that extends outwardly from the base of said body portion, and wherein said mounting post extends outwardly relative to said flange and has a cross-sectional area that is less than the area of said flange-like portion.

10. The arrangement according to claim 1, wherein said battery monitoring circuit includes output means for providing an output that is indicative of the status of a condition being monitored by said battery monitoring circuit, and means coupled to said battery monitoring circuit for providing an indication of the status of said monitored condition at a location remote from the location of the battery being monitored.

11. The arrangement according to claim 10, wherein said output means includes light emitting means for producing a visual output indicative of the status of said monitored condition, and wherein said means for providing an indication includes light conducting means and means for connecting said light conducting means to said housing of said battery monitoring circuit in close proximity to said light emitting means to permit said light conducting means to conduct a light emitted by said light emitting means to said location remote from the location of the battery being monitored.

12. The arrangement according to claim 10, wherein said output means includes means for providing an electrical output signal that is indicative of the status of said monitored condition, and wherein said means for providing an indication includes an electrical signal conducting means and an electrical socket means for connecting said electrical signal conducting means to said battery monitoring circuit to permit said electrical signal to be conducted to said location remote from the location of the battery being monitored.

13. An arrangement for mounting a battery monitoring circuit on the upper surface of a battery cover of a battery and for connecting terminal ends of first and second lead wires of the battery monitoring circuit to the positive and negative terminals of the battery, said arrangement comprising:

first and second battery terminal bushings, said first battery terminal bushing having a body portion adapted for connection to said positive battery terminal and a first extension of a conductive material formed integrally with said body portion of said first battery terminal bushing, said first extension having an upwardly extending mounting post which is adapted to receive said terminal end of said first lead wire;

said second battery terminal bushing having a body portion adapted for connection to said negative battery terminal and a second extension of a conductive material formed integrally with said body portion of said second battery terminal bushing, said second extension having an upwardly extending mounting post which is adapted to receive said terminal end of said second lead wire;

said battery cover having a cavity in said upper surface for receiving said battery monitoring circuit and including securing means cooperating with said battery monitoring circuit for securing said battery monitoring circuit to said battery cover;

a first lead wire slot in said upper surface of said battery cover and extending from said cavity to a location adjacent to said first mounting post;

said first lead wire of said battery monitoring circuit being positioned in said first lead wire slot and extending from said cavity to said mounting post of said first extension with its terminal end located adjacent to said mounting post of said first extension;

a second lead wire slot in said upper surface of said battery cover and extending from said cavity to a location adjacent to said second mounting post;

said second lead wire of said battery monitoring circuit being positioned in said second lead wire slot and extending from said cavity to said second mounting post with its terminal end located adjacent to said mounting post of said second extension;

and means for connecting said terminal ends of said first and second lead wires electrically and mechanically to said mounting posts of said first and second extensions, respectively.

14. The arrangement according to claim 13, wherein said battery cover is molded and first and second wells are molded into said upper surface of said battery cover, and wherein said first and second battery terminal bushings are molded into said battery cover during said molding process with said first and second mounting posts located in said first and second wells and exposed to the upper surface of said battery cover, said first and second lead wire slots terminating at said first and second wells, respectively and said terminal ends of said lead wires extending into said wells for connection to said mounting posts.

15. The arrangement according to claim 14, wherein said means for connecting includes a solder connection between said mounting posts and said terminal ends of said lead wires, and including means for encapsulating at least said wells in which the connections are made between the terminal ends of said lead wires and said mounting posts.

16. The arrangement according to claim 13, wherein said battery monitoring circuit is enclosed within a housing having first and second sidewall portions, and wherein said securing means comprises projections formed on said first and second sidewall portions of said housing that cooperate with recessed portions of the sidewall of said cavity that are adjacent to said sidewall portions of said housing.

17. The arrangement according to claim 16, wherein said housing includes first and second apertures through said sidewall portions, said apertures being aligned with said lead wire slots to guide said lead wires into said lead wire slots.

18. The arrangement according to claim 13, wherein each of said lead wire slots includes wire retaining means for retaining the lead wires within the lead wire slot.

19. The arrangement according to claim 18, wherein each of said lead wire slots includes parallel opposing sidewalls each having a plurality of inwardly directed portions along the length of said lead wire slots, said inwardly directed portions projecting inwardly in pairs defining pinch points for the lead wires.

20. The arrangement according to claim 13, wherein the depth of each of said lead wire slots is such that the lead wire positioned therein is recessed relative to said upper surface of said battery cover.

21. The arrangement according to claim 13, wherein said battery monitoring circuit includes output means for providing an output that is indicative of the status of a condition being monitored by said battery monitoring circuit, and means coupled to said battery monitoring circuit for providing an indication of the status of said monitored condition at a location remote from the location of the battery being monitored.

22. The arrangement according to claim 21, wherein said output means includes light emitting means for producing a visual output indicative of the status of said monitored condition, and wherein said means for providing an indication includes light conducting means and means for connecting said light conducting means to said housing of said battery monitoring circuit in close proximity to said light emitting means to permit said light conducting means to conduct a light emitted by said light emitting means to said location remote from the location of the battery being monitored.

23. The arrangement according to claim 21, wherein said output means includes means for providing an electrical output signal that is indicative of the status of said monitored condition, and wherein said means for providing an indication includes an electrical signal conducting means and an electrical socket means for connecting said electrical signal conducting means to said battery monitoring circuit to permit said electrical signal to be conducted to said location remote from the location of the battery being monitored.

* * * * *